United States Patent Office 3,113,437
Patented Dec. 10, 1963

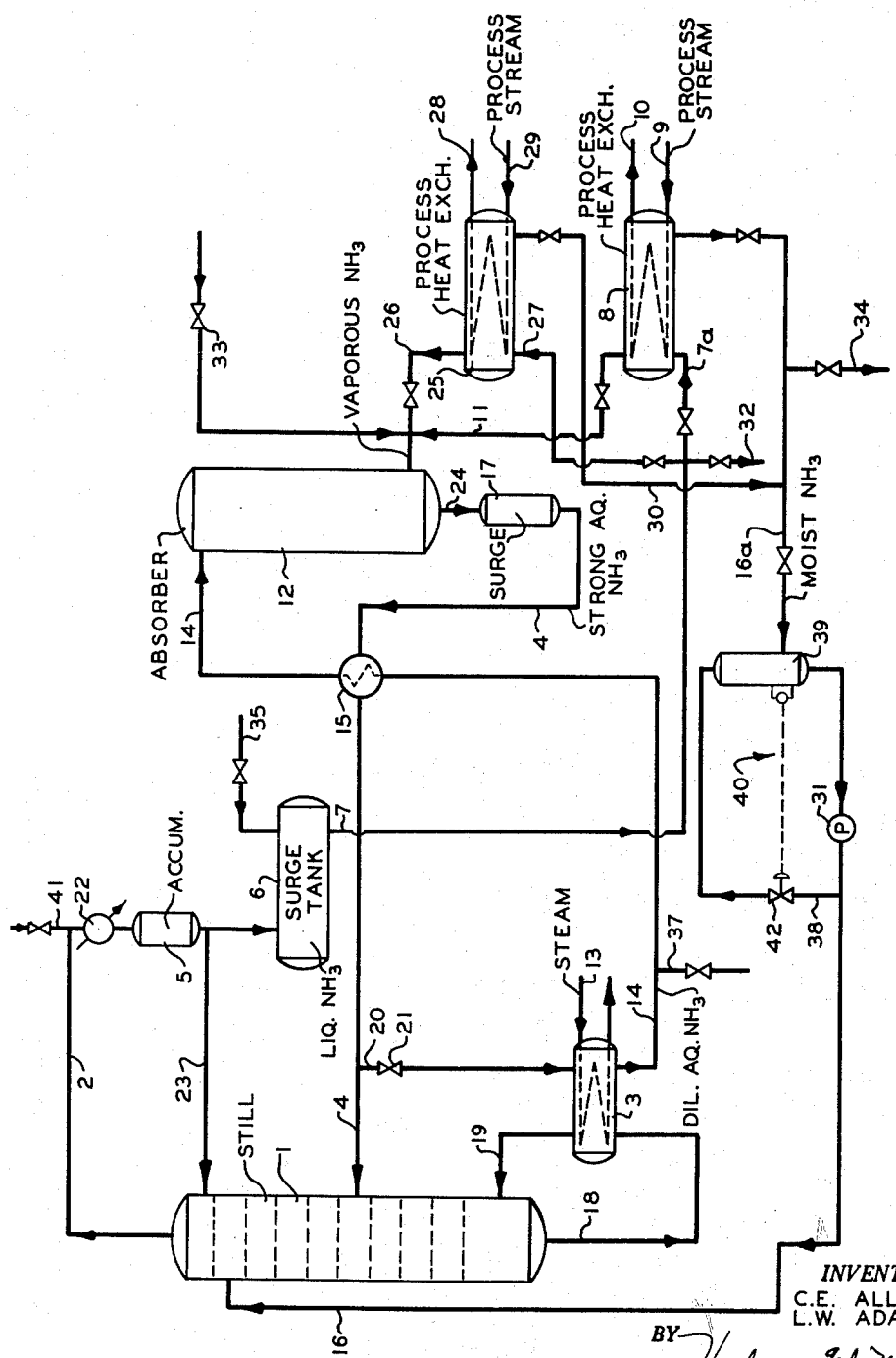

3,113,437
WATER REMOVAL FROM REFRIGERATION UNITS
Carl E. Alleman, Bartlesville, Okla., and Loyd W. Adams, Dumas, Tex., assignors to Phillips Petroleum Company, a corporation of Delaware
Filed Oct. 3, 1960, Ser. No. 60,209
2 Claims. (Cl. 62—85)

This invention relates to a method for the operation of an ammonia refrigeration system. In one aspect it relates to the control of water content of liquid ammonia refrigerant. In another aspect it relates to the method for the operation of a liquid ammonia refrigeration system with specific attention directed to regulation of the water content in liquid ammonia in the refrigeration evaporator.

In liquid ammonia refrigeration systems in which the liquid ammonia is distilled from an aqueous solution of ammonia for the production of anhydrous or substantially anhydrous ammonia, some very minor amount of water passes overhead from the still in the ammonia. While the concentration of water in this distilled ammonia is very minor, yet when this ammonia is evaporated over long periods of time in process heat exchangers, the concentration of the water in the residual ammonia surrounding the heat exchange coils increases markedly in concentration. Thus, after long periods of operation of such heat exchangers, the water content may reach the level of 10 to 15 percent by weight. Also, in the operation of such ammonia refrigeration systems, process upsets occasionally occur whereby abnormally large amounts of water find their way into the otherwise substantially anhydrous liquid ammonia. For example, in a fractional distillation unit employed for producing liquid ammonia from aqueous ammonia, if a reflux pump or a feed pump fails, or even in case a reboiler adds too large an amount of heat to the still by faulty operation, the final result is the production of an overhead liquid ammonia containing an appreciable water content. As is known in the ammonia refrigeration art, as the water content of the liquid ammona refrigerant increases, the temperature available from the evaporating ammonia also increases. Thus, at lower water contents of liquid ammonia, at a given pressure, lower refrigeration temperatures are obtainable. Complementary to this latter condition, the greater the water content in the liquid ammonia, at a given pressure, the less refrigeration is available as regards temperature.

An object of this invention is to provide a process for the maintenance of the water content of liquid ammonia refrigerant at an operably low concentration. Another object of this invention is to provide a process for maintaining the water content of liquid ammonia refrigerant at a very low value while using the water laden reject stream of ammonia to enhance the operation of the ammonia dehydration system. Still another object of this invention is to provide such a process which is simple to operate and to maintain. A further object of this invention is to provide a process for maintaining the water content of the liquid ammonia refrigerant at an extremely low value while maintaining the process refrigeration heat exchangers substantially full of liquid refrigerant in order to maintain the heat exchange tubes fully immersed in refrigerant at all times. Still other objects and advantages of this invention will be realized upon reading the following description which, taken with the attached drawing, forms a part of this specification.

The drawing illustrates, in diagrammatic form, an arrangement of apparatus parts for carrying out the process of this invention.

In the drawing, reference numeral 1 identifies a still of more or less conventional design and suitable for the production of a substantially anhydrous liquid ammonia from an aqueous ammonia feed stock. Overhead vaporous ammonia from the still passes through conduit 2 to a condenser 22 which in turn is connected with an accumulator vessel 5. From accumulator vessel 5 liquid condensate passes into a surge tank 6 with a portion of the ammonia in the accumulator vessel passing through a conduit 23 to the upper portion of the still as reflux. Reference numeral 4 identifies the main feed conduit to the still. Bottoms material is withdrawn through a conduit 18, passed to a heat exchanging reboiler 3 with the heated material from the reboiler passing on through a conduit 19 into the kettle section of the still 1. Steam for providing the reboiling heat enters the reboiler through a conduit 13 from a source, not shown.

From surge tank 6, liquid ammonia passes through a conduit 7 to one or more process heat exchangers. Such refrigeration heat exchangers or evaporators are identified in the drawing by reference numerals 8 and 25. While two of these evaporative heat exchangers are illustrated in the drawing, it is realized that one evaporative heat exchanger, for example exchanger 8, can be used or as many heat exchangers can be used as required. Liquid or vaporous material from an extraneous process enters, for example, evaporator 8 through a conduit 9 and leaves the exchanger through a conduit 10. The stream to be refrigerated from a process enters exchanger 25 through a conduit 29 and leaves this exchanger through a conduit 28.

In one instance, process streams flowing through conduits 9 and 29 originate from a catalytic operation for the production of ammonia. Also, it is obvious that the present refrigeration system can be used for other purposes than cooling streams from ammonia production plants.

Conduit 7 branches into conduit 7a for passage of liquid ammonia to the evaporator 8 while a branch pipe or conduit 27 passes ammonia to the evaporator 25.

Evaporated ammonia from evaporator 8 leaves through a conduit 11 and is introduced into an absorber 12. Evaporated ammonia leaves evaporator 25 through a conduit 26 for passage into the absorber. In case liquid ammonia is added as makeup liquid to the system, it can be introduced through a conduit 35 into the liquid ammonia surge tank 6, from a source, not shown. In case the makeup ammonia is vaporous anhydrous ammonia, this material can be added to the system through a conduit 41, from a source, not shown. In this case, the added ammonia passes through the condenser 22 along with the overhead product in conduit 2 from the still. In case the ammonia added to the system is vaporous ammonia and contains moisture, this type of makeup ammonia is added to the system through a conduit 33, from the source, not shown, and enters the absorber along with a vaporous ammonia from evaporators 8 and 25.

From the reboiler 3, a hot dilute aqueous ammonia bottoms material is withdrawn through a conduit 14, is passed through a cooler 15 and is added to the top of absorber 12 as absorbent liquid. In case the makeup ammonia is added to the system as a dilute aqueous ammonia, this type of makeup material can be added through a conduit 37 into the dilute aqueous ammonia flowing through conduit 14. In case water is required as makeup water, this material can be added also through conduit 37.

Liquid ammonia residual material accumulating in evaporators 8 and 25 after long periods of operation is removed from these vessels through conduit 16a and through conduit 30, respectively. These conduits join to pass the used residual ammonia into a moist ammonia surge vessel 39. A pump 31 takes suction on the ammonia from this surge vessel and passes the ammonia on through conduit 16 for addition to the still. A by-pass conduit 38 around pump 31 is provided so that in case the level of the moist aqueous ammonia in vessel 39 becomes low, the pump 31 will never go on gas. By-pass 38 communicates with conduits 16 downstream of pump 31 and is intended to return pump liquid through conduit 38 into the surge vessel 39. A liquid level controller assembly 40 is provided to open a motor valve in conduit 38 and since the pressure around this by-pass will be lower than the pressure of liquid flowing on through conduit 16, upon opening of motor valve 42, pump discharge will be returned to the surge vessel 39. In this manner, then, the liquid level in the surge vessel should never become so low that pump 31 goes on gas. Upon increase in flow of moist liquid ammonia from conduit 16a and conduit 30 into surge vessel 39 with the by-pass open, the level of this liquid actuates the liquid level controller 40, the motor valve 42 will close and the pump 31 discharge then will be directed through conduit 16 to the still 1.

The water content of the liquid ammonia discharged from the evaporators is relatively low, in comparison to that of the prior art, because the operation is a continuous one, and this discharge can thus be used as a portion of the reflux. This wet ammonia is returned to fractionator 1 at the level of introduction of the reflux from conduit 23 or at a slightly lower tray. One of the advantages of this process of operation is that quite cold liquid ammonia containing some water is introduced into the upper section of still 1 and serves to assist in refluxing the column. Thus, in this manner, less refrigeration is required in condenser 22 for providing reflux. A larger fraction of the liquid ammmonia produced in condenser 22 goes to a process rather than to refluxing the still 1.

As is known in the ammonia refrigeration art, the refrigeration is obtained by evaporating liquid ammonia. From evaporators 8 and 25, the evaporating ammonia leaves through conduits 11 and 26, respectively, and therefrom the ammonia is passed into absorber 12. In this absorber, dilute aqueous ammonia from reboiler 3 is cooled in cooler 15, and is introduced into the absorber at an upper level and this dilute aqueous ammonia flows downward through the absorber to absorb the vaporous ammonia from the evaporators. Water is an extremely powerful solvent for ammonia and this point being the case, a pump is not required in conduit 11 or conduit 26 for passing the vaporous ammonia into the absorber. This ammonia is absorbed in the dilute aqueous ammonia with sufficient rapidity that the absorbing action draws the ammonia from evaporators 8 and 25 through conduits 11 and 26, respectively, into the absorber. Thus, the pressure maintained in the absorber regulates the pressures maintained in evaporators 8 and 25. The enriched aqueous ammonia which is now a strong aqueous ammonia solution leaves the absorber through a conduit 24 for passage to a surge vessel 17. From this vessel the strong ammonia solution is passed through heat exchanger 15 in which it is heated and thence on through conduit 4 into about the mid section, vertically, of fractional distillation column 1.

In case it is ever desired to pass a portion of the strong aqueous ammonia from conduit 4 into the reboiler 3, a conduit 20 provided with a valve 21 is used. However, such a by-pass conduit 20 is often used when the concentration of the ammonia in this aqueous ammonia is about the concentration of the ammonia normally in the reboiler. The by-pass is also used in case the charge liquid in conduit 4 overloads the column. In this case a portion of the liquid goes to the reboiler in which ammonia is vaporized from the water.

In case it is ever desired to withdraw all of the residual liquid from evaporators 8 and 25, this liquid can be withdrawn from the system through valved pipe 34. For such withdrawal, the valve in conduit 16 is closed, the valves in conduits 16a and 30 are open, and the valve in the pipe 34 is open. The valves in pipes 27 and 7a are open or closed depending on whether liquid ammonia is entering the evaporators or not during the withdrawal through conduits 16a and 30.

In case more than two, as for example, eight, evaporators are ever required for a system similar to that explained herein for two evaporators, a valved pipe 32 is provided for passing the liquid ammonia to the additional evaporators. Also, a valved conduit 33 is provided for passage of the vaporous ammonia from the additional evaporators to the absorber 12.

The following tabulation gives process data covering the range of operable conditions in the middle column, and in the third column the specific operational data.

| Line or Process Point | Range | Specific Example |
| --- | --- | --- |
| 7 | 85–140 gal./min., .02–.25 wt. percent H₂O. | 130 gal./min., .05 wt. percent H₂O. |
| 23 | 45–65 gal./min., .02–.25 wt. percent H₂O. | 55 gal./min., .05 wt. percent H₂O. |
| 14 | 15–30 wt. percent NH₃ | 20 wt. percent NH₃. |
| 4 | 20–35 wt. percent NH₃ | 28 wt. percent NH₃. |
| 16 | 1 to 10 gal./min., 2 to 15 wt. percent H₂O. | 5 gal./min., 5 wt. percent H₂O. |

In one instance when the residual liquid $NH_3$ in the evaporators contained 1.5 weight percent water and the vapors were operated at 17 p.s.i.a., a temperature of $-23°$ F. in the body of the ammonia was obtained. With 15 weight percent $H_2O$, and at a pressure of 25 p.s.i.a., a temperature of only $-2°$ F. was obtainable. The pressure carried in the process was about 18 p.s.i.a., which gave an $NH_3$ (15 weight percent $H_2O$) evaporation temperature of $-14°$ F.

Prior art has taught withdrawal of water-containing ammonia from evaporators, batchwise, with its addition to the rich absorber bottoms. In this manner, while the cold ammonia assisted in cooling, by heat exchange, the dilute aqueous ammonia added to the top of the absorber, it also cooled the feed to the still which cooling was not desirable. Additional reboiling heat had to be provided to offset this undesired cooling. According to this invention, the cold ammonia from the evaporators is added as a portion of the reflux to the still, which operation reduces the cooling load (plant cooling water) of cooler 22.

Such auxiliary equipment as pumps, valves, pressure and temperature indicating, recording and control equipment are not shown nor described for purposes of brevity and simplicity. The need for such equipment, its installation and use, are well understood by those skilled in the art.

While certain embodiments of the invention have been described for illustrative purposes, the invention obviously is not limited thereto.

We claim:

1. A method for operating an ammonia refrigeration system wherein water accumulates in the residual liquid ammonia in the refrigerating evaporation step comprising, distilling aqueous ammonia, withdrawing vaporous ammonia from the distilling step, cooling and condensing the withdrawn ammonia and thereby producing liquid ammonia containing a minute concentration of water, dividing the produced liquid ammonia into two portions, returning one portion to an upper tray of the distillation operation as reflux, evaporating the other portion in indirect heat exchange with a process stream thereby cooling same, the concentration of water increasing in the residual liquid ammonia as the ammonia evaporation continues, withdrawing residual liquid ammonia of increased water concentration from the ammonia evaporating step, passing the withdrawn residual liquid from the evaporation step to a surge zone, pumping said liquid from said surge zone and recycling a portion of same to said surge zone as needed to maintain a selected liquid level therein, and passing the remaining portion of the withdrawn ammonia of increased water concentration to the distillation step at least one tray below the level of said upper tray as at least a portion of the reflux.

2. In the method of claim 1, absorbing the evaporated ammonia in a dilute aqueous ammonia solution thereby producing an aqueous solution rich in ammonia, introducing this latter solution into the distillation step as feed stock, withdrawing an aqueous bottoms solution lean in ammonia from the kettle section of said distillation, and adding this lean ammonia solution to the absorbing step as absorbent.

References Cited in the file of this patent

UNITED STATES PATENTS

| | | |
|---|---|---|
| 2,187,497 | Katzow | Jan. 16, 1940 |
| 2,392,894 | Zwickl | Jan. 15, 1946 |
| 2,465,904 | McNeely | Mar. 29, 1949 |
| 2,551,666 | Gilmore | May 8, 1951 |
| 2,826,049 | Gilmore | Mar. 11, 1958 |